UNITED STATES PATENT OFFICE.

FRED M. LOCKE, OF VICTOR, NEW YORK.

INSULATOR.

1,127,044. Specification of Letters Patent. Patented Feb. 2, 1915.

No Drawing. Application filed March 9, 1914. Serial No. 823,628.

*To all whom it may concern:*

Be it known that I, FRED M. LOCKE, of Victor, in the county of Ontario, in the State of New York, have invented new and useful Improvements in Insulators, of which the following is a full, clear, and exact description.

This invention relates to certain improvements in insulators and to a composition for forming insulators for high potential electric conductors and is closely related to my application Serial No. 482,382 for the manufacture of insulators for high potential electric conductors, filed March 9, 1909, and refers more particularly to a composition electric insulator as a new article of manufacture, the ingredients of which are boron or a boron compound in combination with a vitrifiable or fusible base and, although this base may be composed of glass ingredients or porcelain ingredients or may be an aluminum silicate, such as feldspar, yet I prefer to use simply silica or any fusible silica base.

The primary object of my present invention is to increase the inductive capacity, dielectric strength, and heat resisting properties of this class of insulators to more effectively resist puncture or disintegration by an electric current or static charges therefrom, or from temperature or climatic changes.

The broad basic idea of the invention consists in incorporating a suitable quantity of boron or, in view of the difficulty and expense of procuring pure boron, boron in some of its compound forms, in a vitrifiable or fusible base, such as glass ingredients, porcelain ingredients, an aluminum silicate or a fusible silica base to increase the inductive capacity, dielectric strength and resistance to puncture or disintegration by the electric current and sudden temperature and climatic changes and reference is hereby made to my co-pending application Serial No. 802,295 which contains the broad claims to boron in combination with a vitrifiable or fusible base, and which application is likewise closely related to my co-pending application Serial No. 482,382 so far as said application, Serial No. 802,295, describes and claims a vitrifiable or fusible base in combination with boron.

Reference is also hereby made to my co-pending application Serial No. 497,095, plastic compositions, filed May 19, 1909, in which I have claimed a particular form of vitrifiable or fusible base in combination with a boron compound.

As an example of the advantages of an insulator formed of the ingredients herein described, in the experiments which I have made to determine the relative specific inductive capacity of air, glass, porcelain and this composition, I find that the specific inductive capacity of this composition is three times as great as that of the commercial porcelain insulators of the same size and form; six times as great as glass, and twelve times as great as air.

In the tests which I have made to determine the resistance to puncture by high voltage, I find that where a porcelain insulator of the best quality was capable of resisting 80,000 volts, an insulator made of my improved composition and of the same size and form as the porcelain insulator withstood 100,000 volts, or 20,000 volts more than the porcelain insulator, which was due solely to the increased specific inductive capacity and dielectric strength produced by the boron or boron compound. This high inductive capacity and dielectric strength is probably due to the fact that boron and hydrogen form no compound or compounds under fusion and except in one or two special instances, and under special circumstances boron forms no compound whatsoever with hydrogen.

The manufacture of high potential porcelain insulators is well understood and in the formation of an insulator from my improved composition, the boron or the boron compound; such as borax, boracic acid etc. and the base ingredient or ingredients are thoroughly mixed in suitable proportions, the proportion of boron or of the boron compound ranging anywhere from 1% to 60%, according to the specific inductive capacity required, although the smallest percentage is effective in adding materially to the dielectric strength and tenacity of the insulator, and then molding and firing the composition mass in the usual manner of forming insulators, or in any other desirable manner.

The invention herein relates to a structure adapted to serve as an insulator in the technical meaning of the term as applied to an article of manufacture, and the terms "insulating support for line conductors" and "insulator for high potential electric "conductors" are used in the claims herein to clearly define such structure as an article of manufacture to serve as an insulator in the technical meaning of the term.

What I claim is:

1. An insulator for high potential electric conductors comprising silica and a boron compound fused together in a homogeneous body.

2. An insulator for high potential electric conductors comprising a fusible silica base and a boron compound fused together in a homogeneous body.

3. An insulator for high potential electric conductors comprising silica and a boron compound fused together into a homogeneous body, molded and fired.

4. An insulating support for line wires formed of a composition body comprising silica and a boron compound.

5. An insulating support for line conductors comprising a fusible silica base and a boron compound fused together in a homogeneous body.

6. An insulating support for line conductors comprising silica and a boron compound fused together in a homogeneous body.

In witness whereof I have hereunto set my hand this 5th day of March, 1914.

FRED M. LOCKE.

Witnesses.
A. S. NEWELL,
D. S. BARRY.